March 4, 1958  L. L. WILLIAMS  2,825,121
MULTIPLE AUTOMATIC BAR CUTTING MACHINE
Filed March 25, 1953  11 Sheets-Sheet 1

Inventor:
Leo L. Williams
By Schroeder, Merriam,
Hofgren & Brady
Attorneys

March 4, 1958

L. L. WILLIAMS 2,825,121

MULTIPLE AUTOMATIC BAR CUTTING MACHINE

Filed March 25, 1953

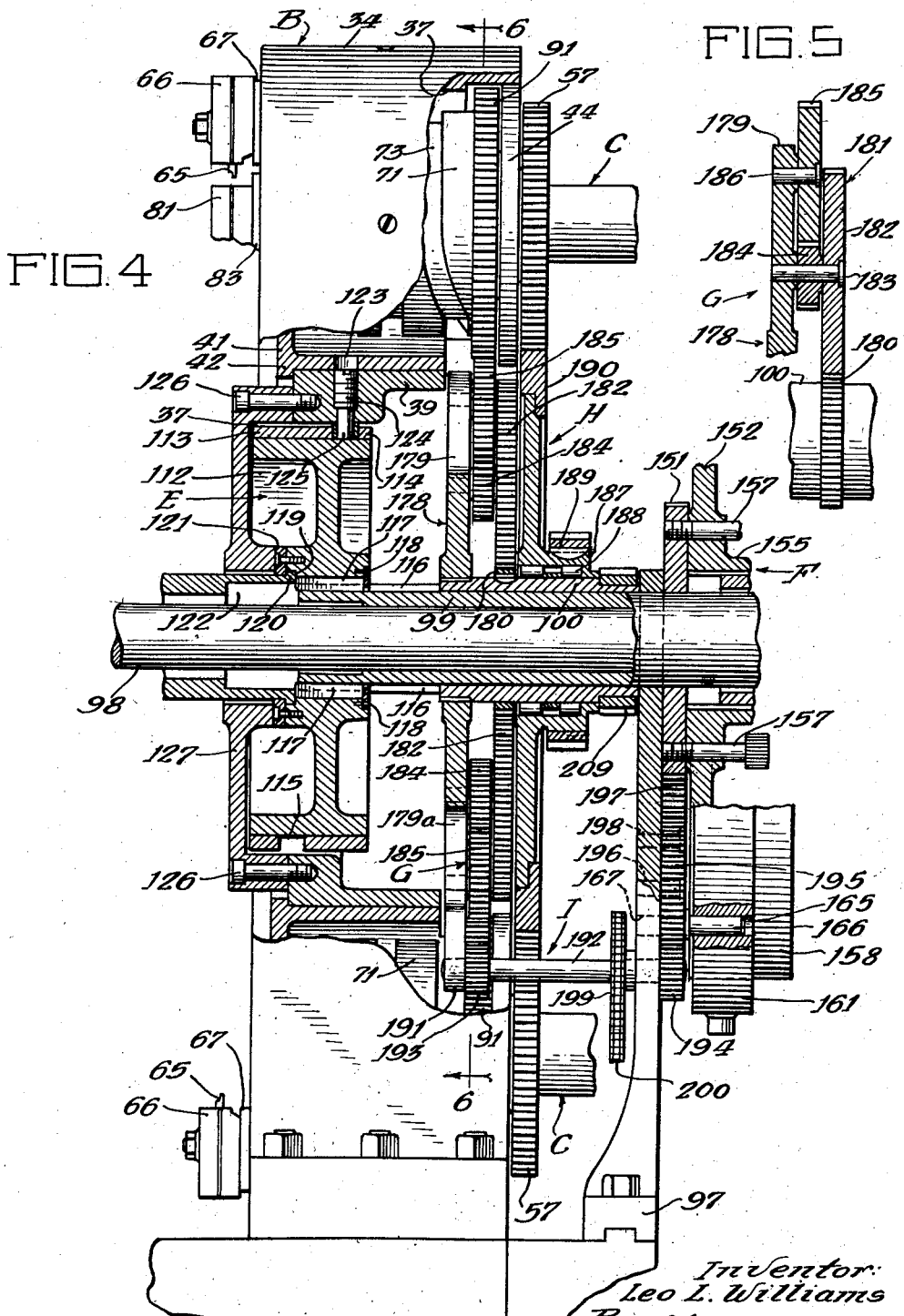

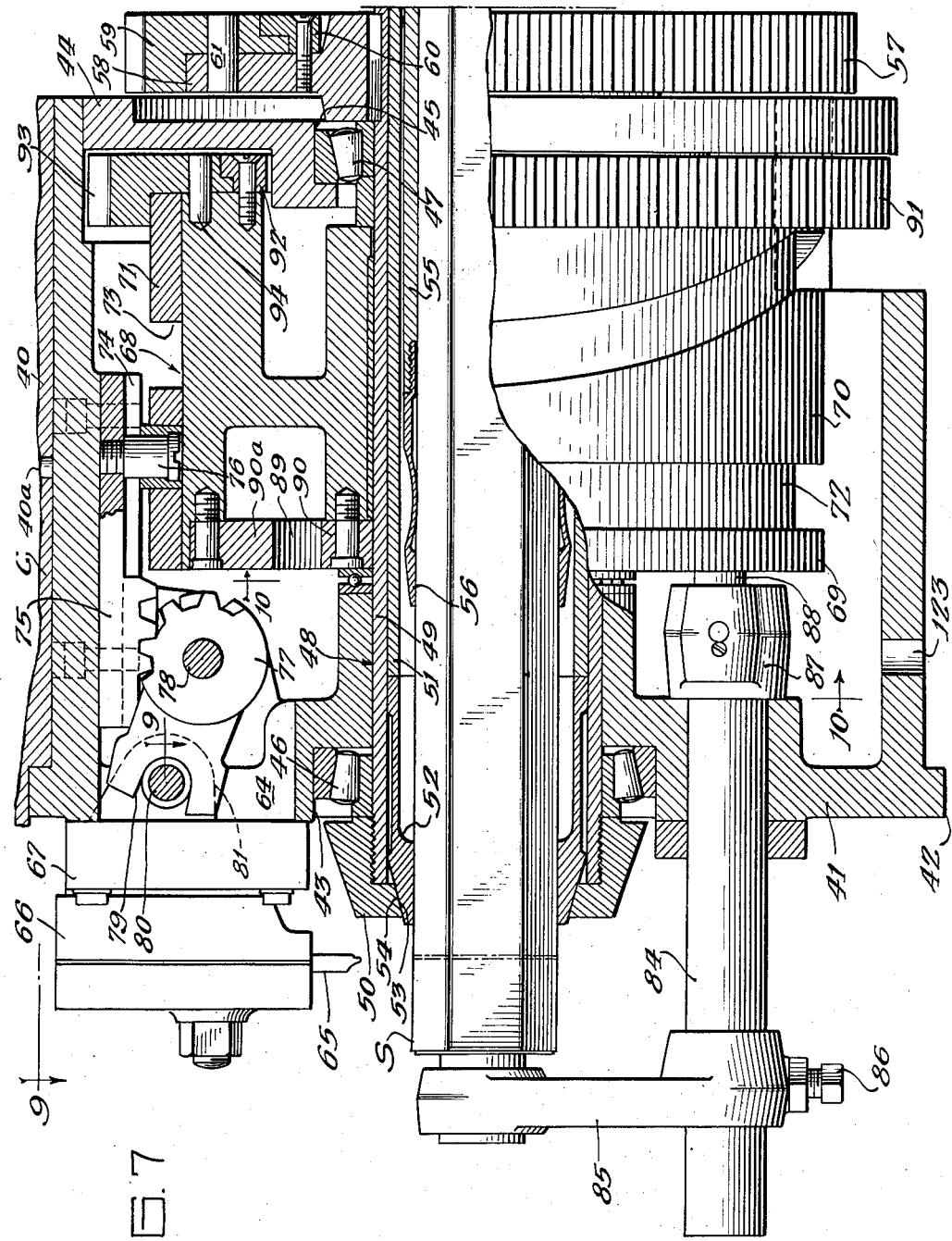

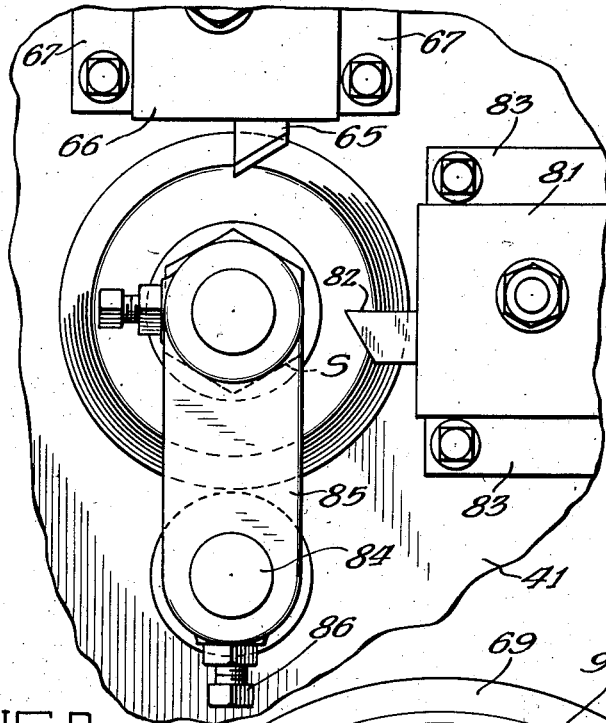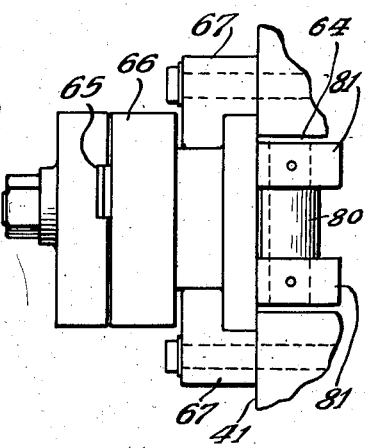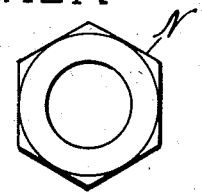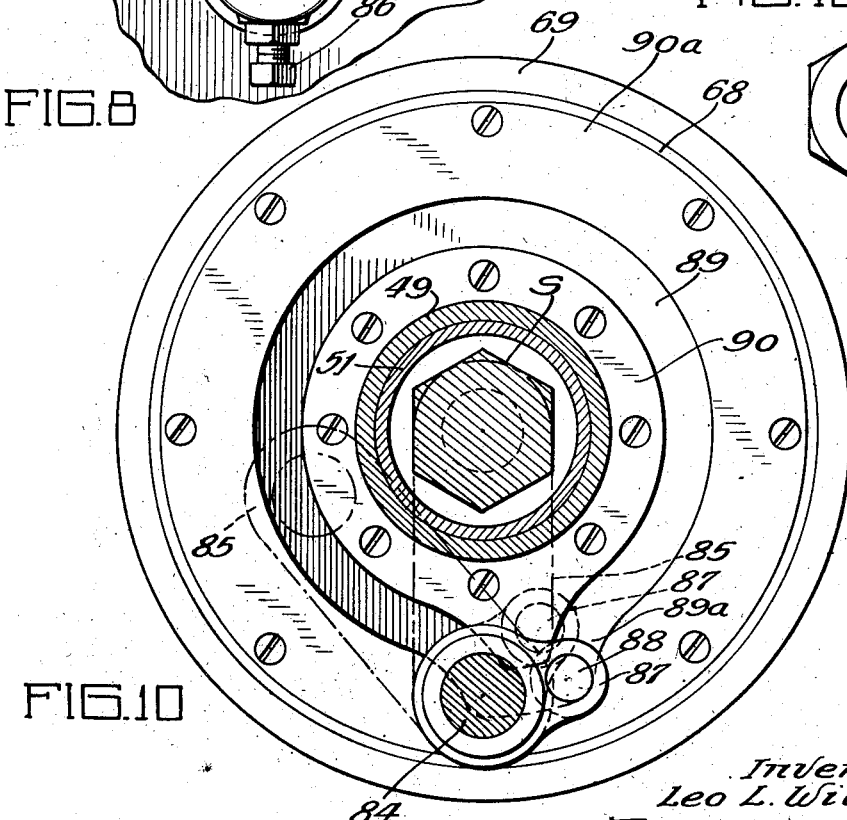

March 4, 1958 L. L. WILLIAMS 2,825,121
MULTIPLE AUTOMATIC BAR CUTTING MACHINE
Filed March 25, 1953 11 Sheets-Sheet 8
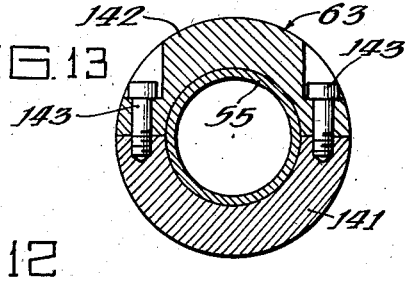
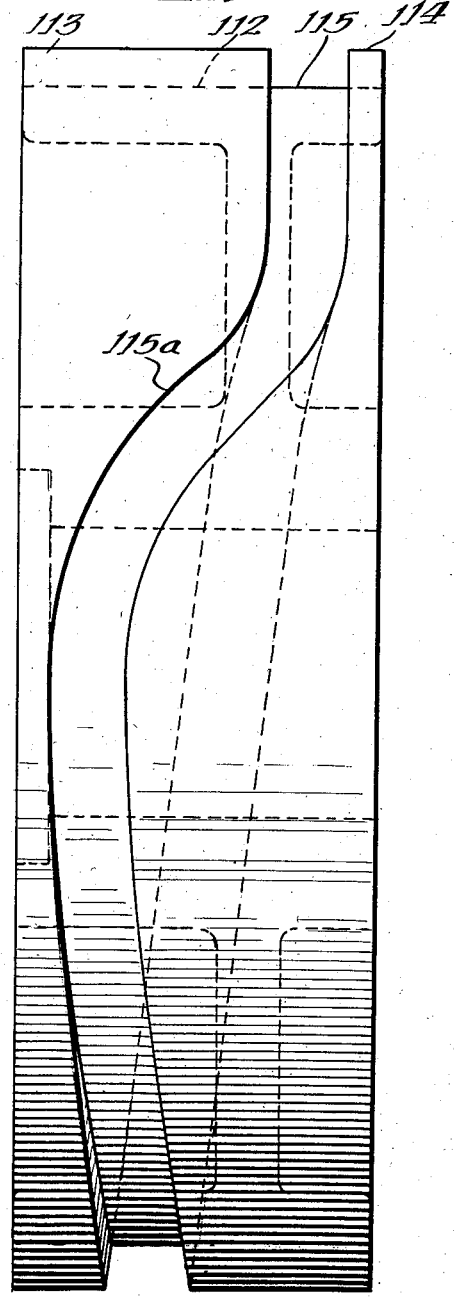
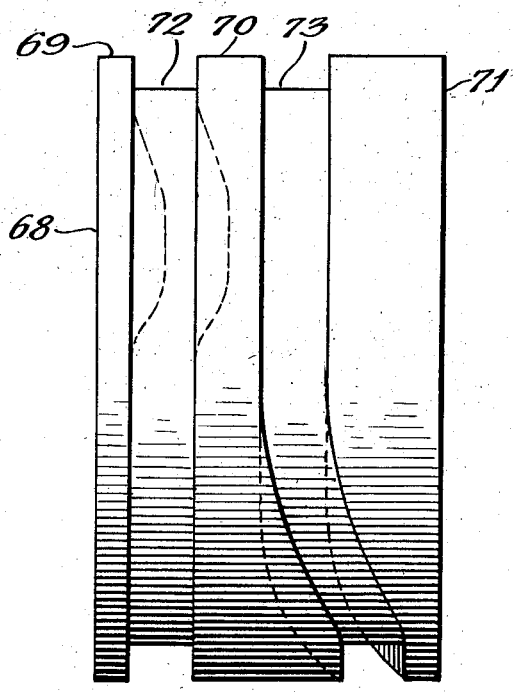
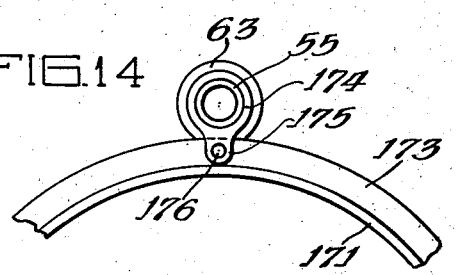
Inventor:
Leo L. Williams
By Schroeder, Merriam,
Hofgren & Brady
Attorneys

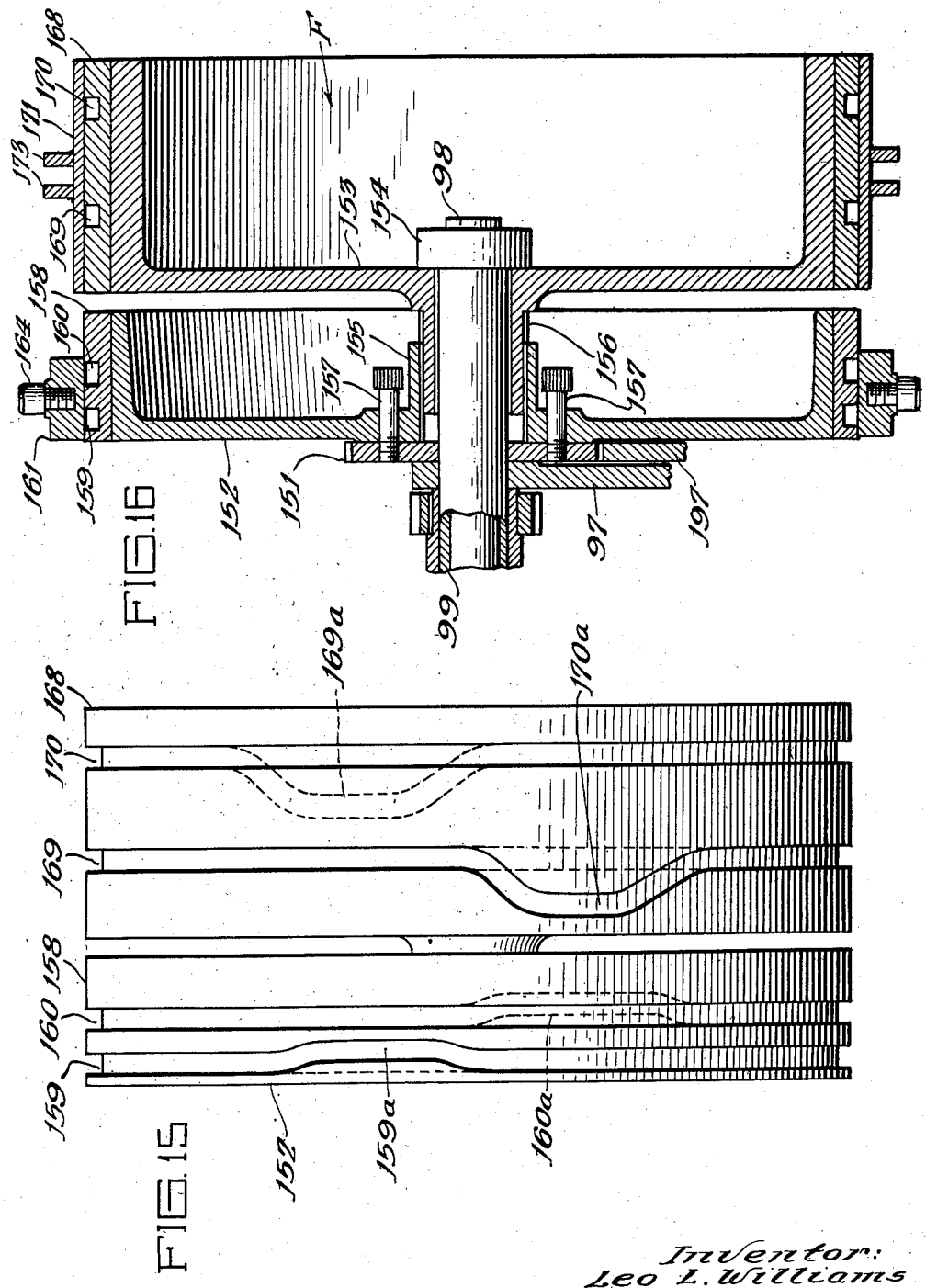

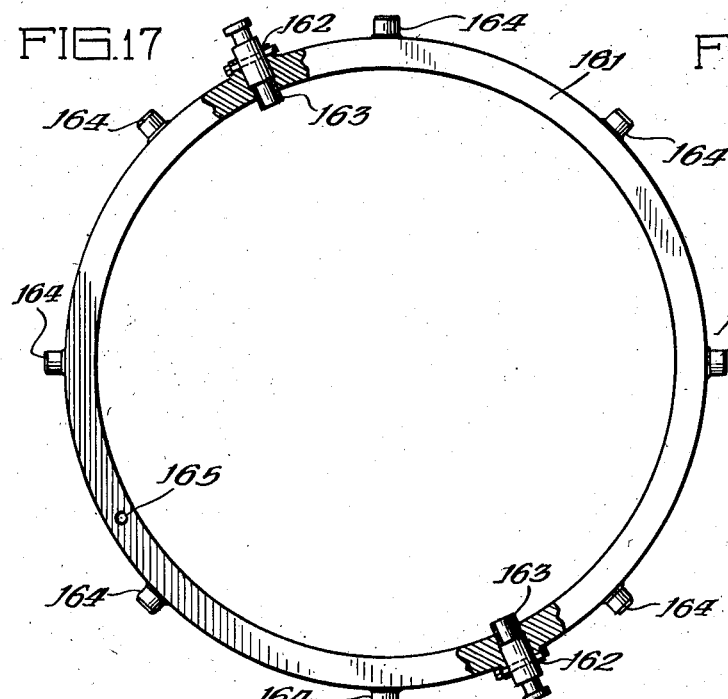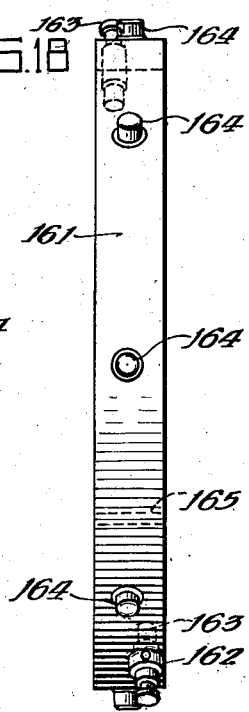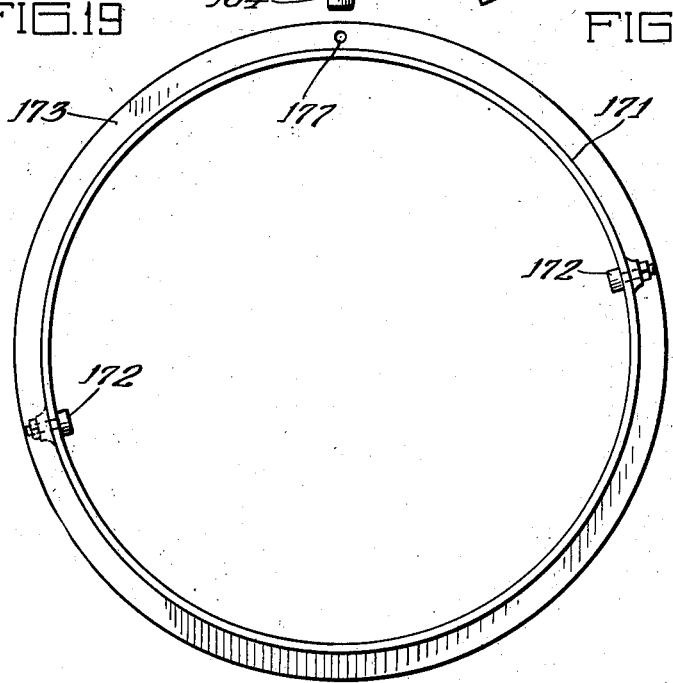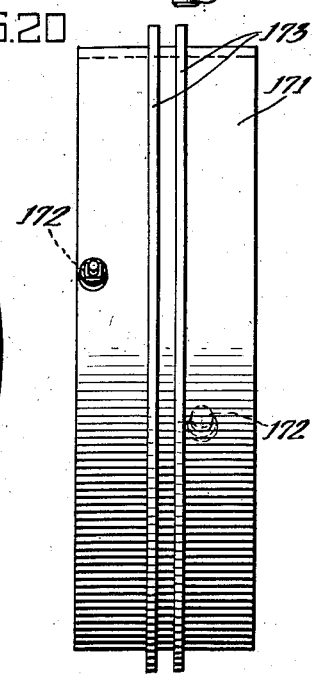

March 4, 1958   L. L. WILLIAMS   2,825,121
MULTIPLE AUTOMATIC BAR CUTTING MACHINE
Filed March 25, 1953   11 Sheets-Sheet 11

Inventor:
Leo L. Williams
By: Schroeder, Merriam,
Hofgren & Brady
Attorneys

United States Patent Office 2,825,121
Patented Mar. 4, 1958

2,825,121

MULTIPLE AUTOMATIC BAR CUTTING MACHINE

Leo L. Williams, Cleveland Heights, Ohio, assignor of forty percent to Luminator Harrison, Inc., a corporation of Illinois; Lucy H. Williams, executrix of said Leo L. Williams, deceased, assignor of sixty percent to Lucy H. Williams Application March 25, 1953, Serial No. 344,619

14 Claims. (Cl. 29—37)

This invention relates to a multiple head automatic bar cutting machine of the sort which is used for cutting various sorts of articles, such as hex nut blanks, out of bar stock.

The principal object of the invention is to provide an improved automatic machine, here termed generally a "bar cutter," for cutting hex nut blanks and the like from bar stock.

Another object is to provide a multiple head bar cutter in which the power for operating and controlling one or more forming heads is transmitted to a single distributing shaft assembly through which the drive and all the operating controls for the desired number of heads are operated.

Another object of the invention is to provide a standardized, forming head unit having bar turning, bar feeding, stopping and locking, and bar machining elements all of which may be driven and controlled from a single power and control shaft assembly so that a single head machine, or machines having two, four, six, eight or a larger even number of heads may be set up, and all the heads driven and controlled by standardized elements through the one control shaft.

Another object of the invention is to provide a multiple head bar cutting machine in which a reciprocable spider mounted on the front of the central distributing shaft has fixed drill bits or other forming tools, such as die stocks, which are moved simultaneously into and out of drilling engagement with the ends of bar stock in all the forming heads by a control hub which is driven by the same drive which controls all the elements in the forming heads.

Another object of the invention is to provide a single bar stock feed control cam drum assembly on the central distributing shaft which controls the bar feed on all the forming heads in a machine.

Another object of the invention is to provide a machine in which a gear train driven directly from the central power shaft drives the feed stop and tool control cam drum in a pair of adjacent forming heads, so that a pair of such gear trains may drive the control cams in four forming heads or three gear trains may be employed for a six head machine, or four gear trains in an eight head machine, and so on.

The invention is illustrated in the accompanying drawings as applied to an eight head machine, it being understood that substantially the same basic arrangement of drive and control elements could be used for a machine having a smaller or larger number of heads.

In the accompanying drawings:

Fig. 4 is an enlarged fragmentary sectional view to show particularly the central distributing shaft assembly and the driving connection to the forming heads;

Fig. 5 is a fragmentary section on enlarged scale taken as indicated along the line 5—5 of Fig. 6;

Fig. 7 is a fragmentary central section of the forward part of a forming head unit, leaving out the portion which carries the locking and pusher tube actuating means;

Fig. 8 is an enlarged fragmentary front elevation of a forming head;

Fig. 9 is a fragmentary section taken as indicated along the line 9—9 of Fig. 7;

Fig. 10 is a fragmentary section taken as indicated along the line 10—10 of Fig. 7;

Fig. 10a is a front elevation of a hex nut blank which is typical of the type of article which may be produced from bar stock by the machine of the invention;

Fig. 11 is a side elevation of the control hub for reciprocating the drill carrying spider;

Fig. 12 is a side elevation of the tool control cam drum for a forming head;

Fig. 13 is an enlarged section taken as indicated along the line 13—13 of Fig. 2;

Fig. 14 is a fragmentary rear elevation showing the locking pin to prevent rotation of the floating pusher control ring illustrated in Fig. 19;

Fig. 15 is a side elevation of the bar feed control cam drum;

Fig. 16 is a fragmentary central section through the rear of the central distributing shaft assembly and bar feed control cam drum assembly;

Fig. 17 is a front elevation partly in section showing the floating ring which engages the locking control cam drum to control operation of the locking mechanism shown in Figs. 22 and 23;

Fig. 18 is a side elevation thereof;

Fig. 19 is a rear elevation of the floating ring which engages the pusher control cam drum to control the pusher actuator;

Fig. 20 is a side elevation of the floating ring shown in Fig. 19;

Figure 2:
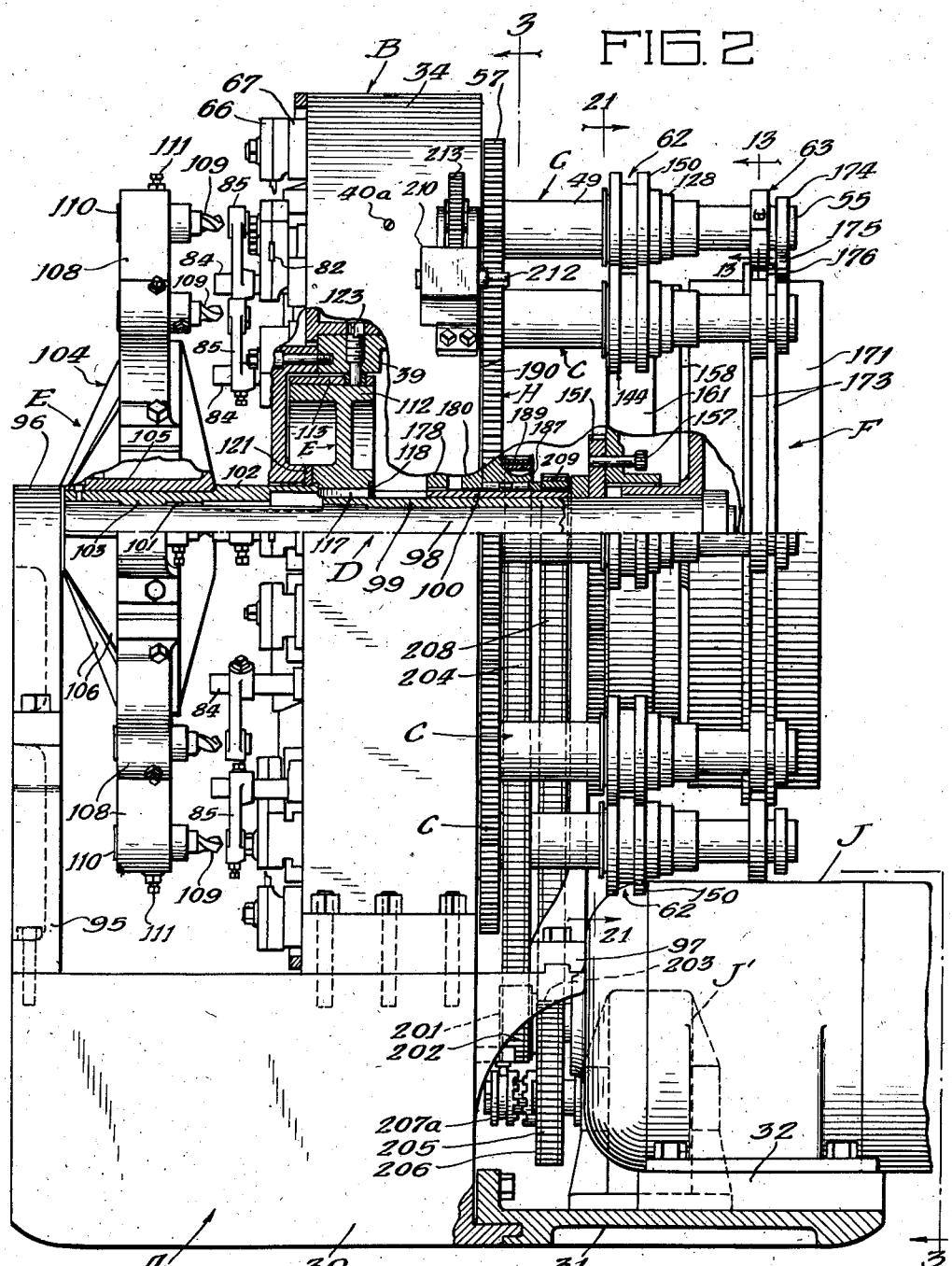
Fig. 2 is a side elevation of such a machine partially in section.
Figure 3:
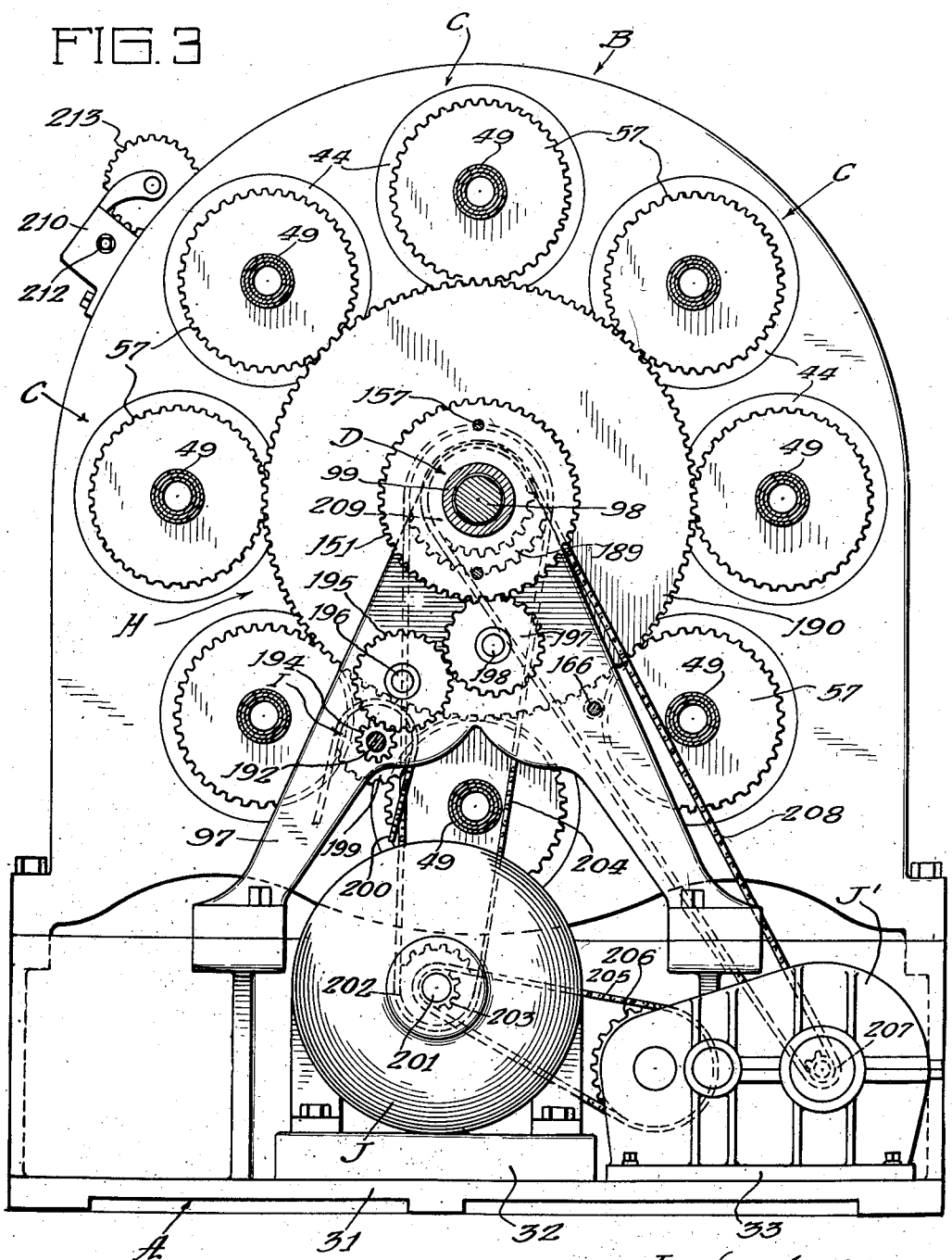
Fig. 3 is a section taken as indicated along the line 3—3 of Fig. 2.
Figure 6:
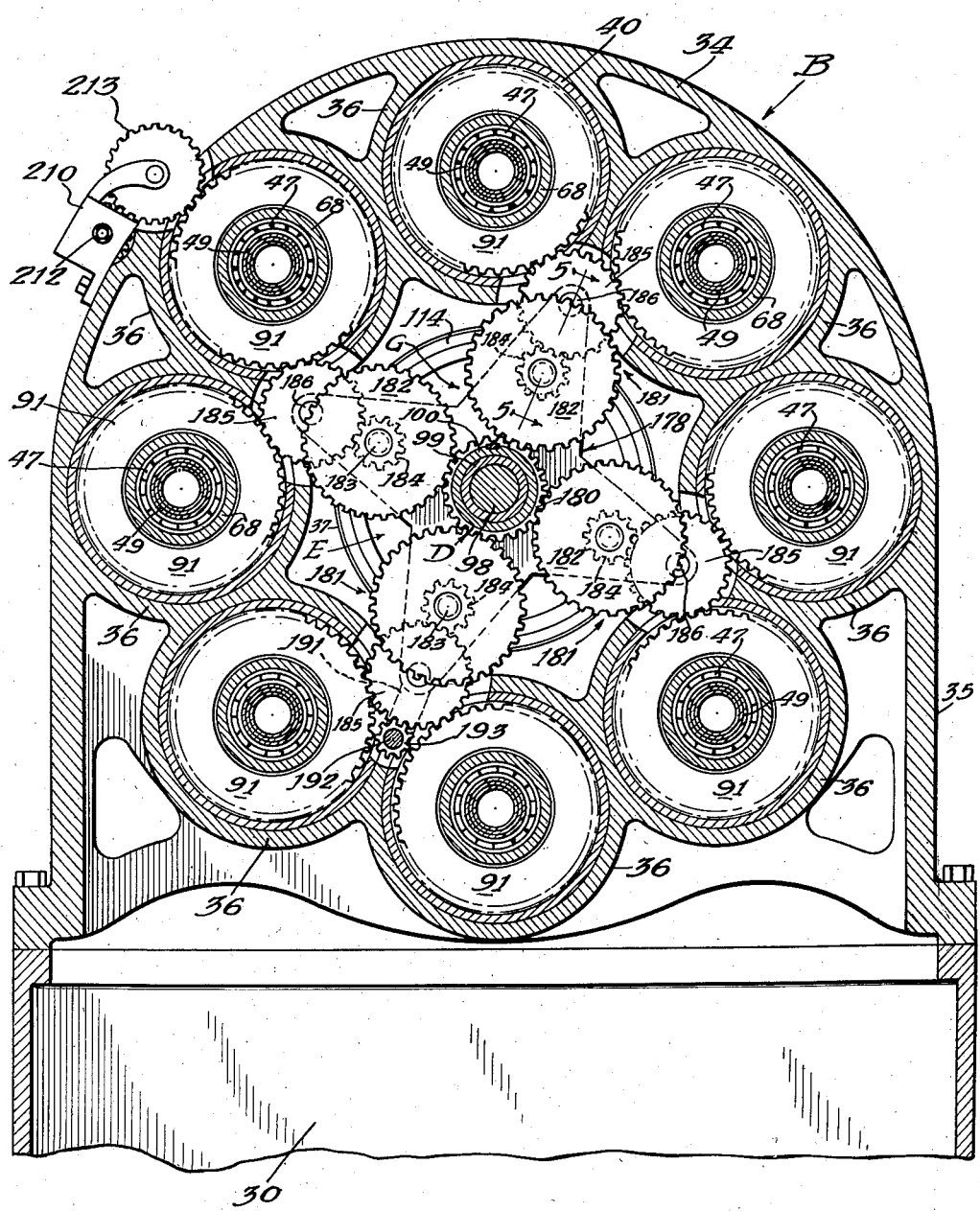
Fig. 6 is a section to a reduced scale taken as indicated along the line 6—6 of Fig. 4.
Figure 21:
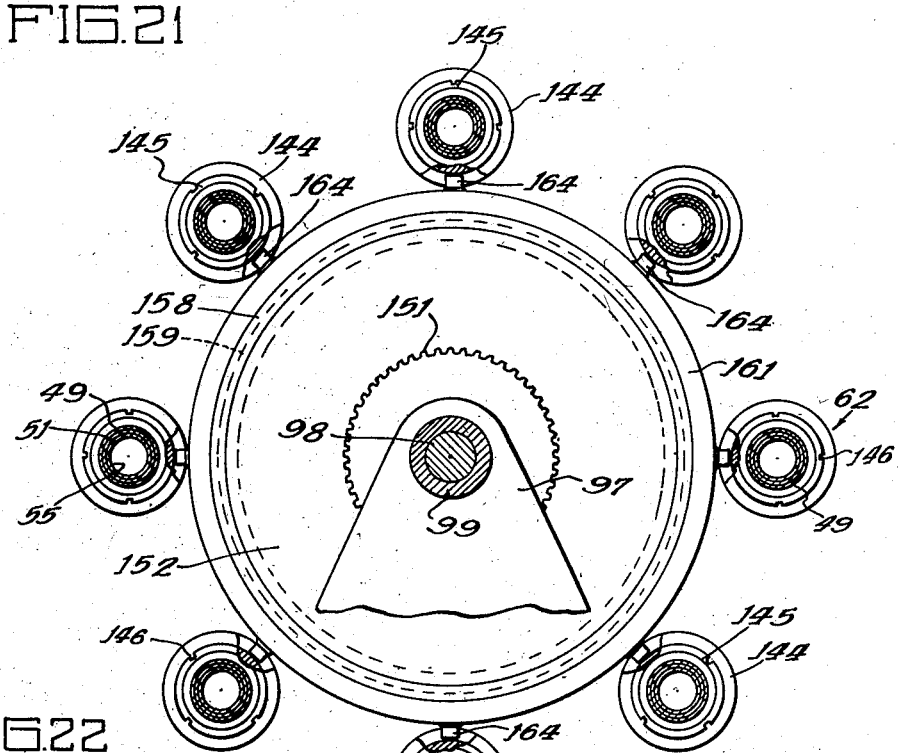
Fig. 21 is a section taken as indicated along the line 21—21 of Fig. 2.

Referring to the drawings in greater detail, and referring first to Fig. 2, the multiple head automatic bar cutting machine of this invention consists generally of several major components, as follows: a base assembly indicated generally at A; a main support frame assembly indicated generally at B; eight forming heads, indicated generally at C; a central distributing shaft assembly, indicated generally at D; a drill spider and spider control hub assembly, indicated generally at E and E', respectively; a feed control cam drum assembly, indicated generally at F, which controls the operation of the pusher and locking mechanisms for the eight forming heads C; as best seen in Figs. 4 and 6, a tool control drive G, which includes a plurality of gear trains and a cruciform frame; as seen in Figs. 2 and 3, a main drive H for driving all eight of the forming heads from the distributing shaft assembly; as best seen in Figs. 3 and 4 an intermediate drive I for driving the control tube which carries the feed control cam drum assembly and drill spider control cam hub assembly; and as seen in Figs. 2 and 3, a motor J, gear reduction unit J' and the driving connections from said elements to the distributing shaft assembly.

Figure 1:
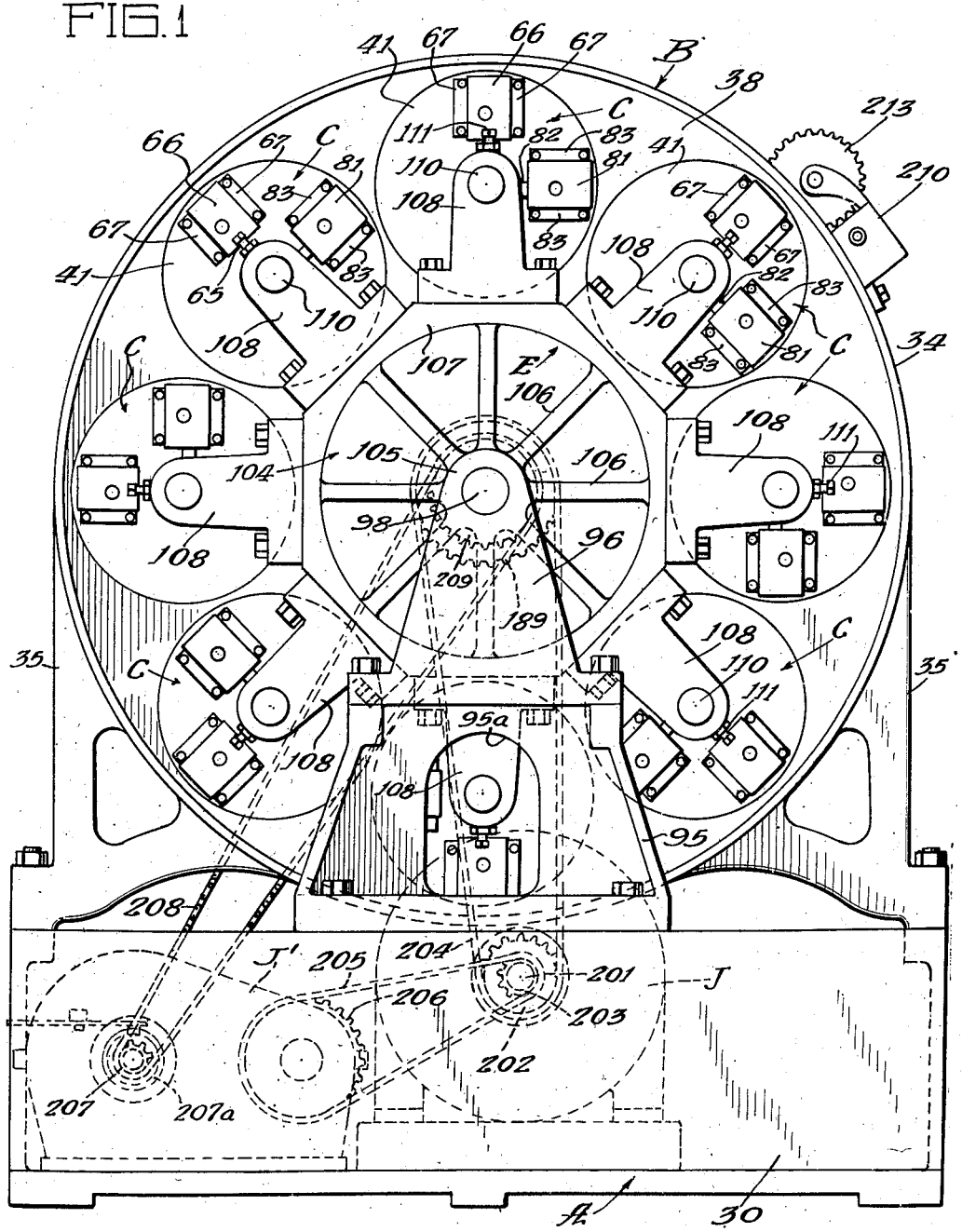
Fig. 1 is a front elevation of an automatic eight head bar cutting machine constructed in accordance with the invention.

Referring to the drawings for the purpose of describing the several major components and referring first to Figs. 1 to 3, the base assembly A comprises a rectangular casting 30 which forms the principal base member for the machine, said casting 30 being of substantial depth and being hollow so as to provide a reservoir for coolant oil and a chamber in which chips and shavings from the machining operations may collect. At the rear of the casting 30 is a platform base 31 which is bolted to the casting 30 and is substantially at the level of the bottom of said casting. As best seen in Fig. 3 the platform base 31 supports a motor block 32 and a base 33 for a gear reduction unit which are positioned rearwardly of the main base casting 30.

As best seen in Figs. 1, 4 and 6 the main frame B is supported on top of the base casting 30, and consists of a single large machined casting having a deep arcuate side wall 34 which merges into legs 35 provided with feet by means of which the main frame B may be bolted to the base casting 30. As best seen in Fig. 6, disposed within the deep arcuate side wall 34 is a plurality of closely adjacent cylindrical cells 36 which have their axes arranged parallel to and equidistant from the axis of a central bore 37 which is formed in a generally annular face plate portion 38 and has a rearwardly extending annular wall 39. Each of the cylindrical cells 36 provides a bore to receive one of the eight forming heads C, and the central bore 37 provides a cavity for the central distributing shaft assembly D and the control hub assembly E' for the drill spider E. Thus, the forming head units C are supported in the bores provided by the cylindrical cells 36 in positions parallel to and equidistant from the axis of the central distributing shaft assembly D.

Referring now to Figs. 7 to 12, and referring first to Fig. 7, each of the forming head units C has a cylindrical housing 40 which slides into the bore provided by one of the cells 36 in the main frame B and may be secured therein by a screw 40a extending through the main frame B. The housing 40 has a front plate portion 41 provided with a peripheral flange 42 which abuts against the front plate portion 39 of the main frame. The front plate 41 is generally annular and has a recessed central flange to provide a supporting ring 43, and a removable back plate 44 for the housing is likewise annular and has a recessed central flange to provide a supporting ring 45 so that said rings may receive roller bearings 46 and 47, respectively, in which is journalled a bar stock turning and feeding assembly, indicated generally at 48.

The bar stock turning and feed assembly 48 includes a drive tube 49 which is threaded at its forward end to receive a locking ring 50 which is positioned forward of the front plate 41 of the housing 40 and which serves to retain in position the roller bearing assembly 46. Slidably mounted within the drive tube 49 is a locking tube 51 the forward end of which abuts against a longitudinally split locking collet 52 which has an external frusto-conical forward surface 53 engaging a complementary internal frusto-conical surface 54 on the locking ring 50, so that forward pressure on the locking tube 51 will force the collet 52 into the locking ring 50 and drive the fingers of the collet into firm gripping engagement with a piece of hex bar stock S which is carried within the drive tube 49. Inside the locking tube 51 is a pusher tube 55 which is threaded at its forward end to receive a longitudinally split pusher collet 56 which is of the conventional construction so that if the pusher tube 55 is urged forwardly when the locking collet 52 is loose in the locking ring 50 the pusher collet 56 will grip the bar stock S and move it forward, while upon reverse motion of the pusher tube 55 the collet 56 slides over the bar stock without gripping.

The drive tube 49 has a keyway behind the back plate 44 of the housing 40 to receive a gear 57 by means of which it may be driven. The gear 57 includes a base member 58 which is keyed onto the tubular shaft 49, and a toothed ring 59 which is rotatably held in place by means of a friction plate 60 which is fastened to the base member 58 with screws. In order to prevent damage to the mechanism in case of jamming the toothed external gear ring 59 is pinned to the base portion 58 by means of wooden shear pins 61 which are assisted in holding the gear parts together by the friction plate 60.

As seen in Fig. 2 the forming head unit C projects a substantial distance rearwardly from the main frame B and is provided with a locking tube actuating assembly 62 for pushing the locking tube 51 forwardly, and a pusher tube actuating ring 63 for reciprocating the pusher tube. The members 62 and 63 will be described in more detail in connection with the control cam drum assembly F which controls the operation of these members.

As best seen in Figs. 7 to 9, in the front plate 41 of the forming head C is a radial slot 64 to accommodate the actuating linkage for a forming tool 65 which shapes the front of a nut blank N (Fig. 10a) to give it the desired arcuate shape. The forming tool 65 is bolted into a tool carrying block 66 which is slidably mounted in a pair of spaced radial guideways 67 which are screwed to the front plate 41 of the housing so that the tool carrying block 66 is radially slidable to move the tool 65 into or out of cutting engagement with the bar stock S. Movement of the slidable tool carrying block 66 is effected by means of a concentrically mounted tool control drum 68 which is journalled on the drive tube 49. As seen in Fig. 12, the tool control drum 68 carries a circumferential forward cam ring 69, a central cam ring 70 and a rear cam ring 71 which are positioned in spaced relationship to one another to provide a pair of circumferential cam tracks 72 and 73, the cam track 72 being for the purpose of controlling the movement of the tool carrying block 66 for the tool 65 which forms the front of the nut blank N.

Returning to Fig. 7, secured to the top of the housing 40 are a pair of guideways 74 to slidably support a toothed rack 75 which is provided at its rear portion with a roller pin 76 which extends into the cam track 72 so that rotation of the tool control drum 68 causes the toothed rack 75 to reciprocate, thereby rocking a fork-like toothed link 77 which is pivotally mounted on a cross shaft 78 and has a fork 79 at its forward end which projects into the slot 64 in the front plate 41 of the housing 40 to engage a roller pin 80 which, as seen in Fig. 9, is supported between a pair of spaced lugs 81 on the rear of the tool carrying block 66. Thus, as the toothed rack 75 slides forward the toothed link 77 pivots downwardly, moving the tool carrying block 66 radially inwardly to bring the forming tool 65 into engagement with the bar stock, and when the rack slides rearwardly the tool 65 is returned to its idle position.

Referring to Fig. 8, set at 90° to the tool holding block 66, is a second tool holding block 81 which carries a cutoff tool 82 for severing the finished nut blank N from the bar stock S, the tool holding block 81 being mounted in guideways 83 for radial movement as is the tool holding block 66. The controls for the tool holding block 81 are not shown or described in detail, inasmuch as they are identical with those for the tool holding block 66, and are controlled by means of the cam track 73 in the tool control cam drum 68.

As best seen in Figs. 7, 8 and 10, the front plate 41 of the housing 40 is bored at a position directly opposite the forming tool 65 to receive a rocking shaft 84 having at its outer end an adjustably mounted stop arm 85 which is secured to the rocking shaft 84 by means of a set screw 86. As best seen in Figs. 8 and 10, the rocking shaft 84 may be rotated to swing the stop arm 85 between a stop position in front of the bar stock, as in Fig. 8, where it may limit the forward feed of bar stock by the pusher collet 56, and an idle position clear of the bar stock, shown in broken lines in Fig. 10. This action of the stop arm 85 is produced and controlled by means of a lever 87 on the rocking shaft 84 and a roller pin 88 which engages a track 89 formed between an interior face cam 90 and an exterior face cam 90a which are screwed into a central recess in the front of the tool control cam drum 68, so as to be integral therewith.

The tool control cam drum 68 may be rotated by means of a gear 91 which is secured to the rear end of the drum. Like the drive gear 57 for the forming head drive tube 49, the gear 91 has a flanged mounting ring 92 which is screwed to the rear end of the drum 68, a tooth carrying ring 93 which has an internal flange by means of which it is rotatably secured in place behind the flange on the mounting ring 92, and a wooden shear pin 94 which pins the tooth carrying ring 93 to the rear end of the drum 68 to prevent it from rotating with respect to the drum.

The central distributing shaft assembly which supports the drive and control mechanisms for the eight forming heads C is best seen in Figs. 2 and 4. A front distributing shaft base member 95 is cut away at 95a to permit removal of the bottom drill from the tool carrying spider F and the forming tools 65 and 82 from the bottom forming head C, and has a removable shaft bracket 96 bolted onto its top surface and spaced rearwardly from the base member 95 is a rear support bracket 97 which is also bolted to the base casting 30. The distributing shaft assembly proper is supported in the brackets 96 and 97, and extends axially through the central opening 37 in the main frame member B. As best seen in Fig. 4, the distributing shaft assembly proper includes a fixed mounting shaft 98, on which a control tube 99 is rotatably mounted, there being likewise a drive tube 100 which is rotatably mounted on the control tube 99. The drive tube 100 extends rearwardly only to the inner face of the rear mounting bracket 97, but the control tube 99 and fixed mounting shaft 98 extend through the rear mounting bracket 97, and the feed control cam drum assembly F is mounted on the control tube 99 to the rear of the rear mounting bracket 97.

As best seen in Figs. 1 and 2, the tool carrying spider E is slidably mounted on the front of the fixed mounting shaft 98 between the front of the main frame B and the front mounting bracket 96, there being guideways 101 cut in the top and bottom of the mounting shaft 98 for this purpose. The tool carrying spider E has a mounting piece 102 surrounding the fixed support shaft 98, said mounting piece being provided with guide ribs 103 which slide in the guide slots 101 of the mounting shaft 98. As seen in Fig. 1, the tool carrying spider also includes an octagonal frame 104 which has a hub portion 105 bolted to the mounting tube 102 and spokes 106 extending radially outward to the octagonal peripheral supporting portion 107 of said member. On each face of the supporting portion 107 is mounted a drill holder 108 which is bolted to said face and has a fixed drill bit 109 carried in a tool holder 110 which is secured in the tool base 108 by means of a set screw 111. Each of the drill bits 109 is directly aligned with the bar stock S in one of the forming heads C, so that reciprocation of the drill carrying spider E in the guideway 101 may bring all eight drill bits 109 simultaneously into drilling engagement with the front of the rotating stock S, and may withdraw the drill bits from the stock when a drilling operation is completed.

As best seen in Fig. 4, movement of the drill carrying spider E is controlled by a drill spider control assembly E', the major component of which is a control cam hub 112 which is shown in elevation in Fig. 11. The control cam hub 112 has a pair of circumferential cam members 113 and 114 which are spaced apart to provide a cam track 115; and is supported in a pair of guideways 116 at the front of the control tube 99 by means of a pair of loose slide blocks 117 which are held in place by small gib plates 118. The front of the control cam hub 112 extends forwardly (to the left in Fig. 4) of the slide blocks 117 and is provided with an annular recess 119 to receive a circumferential flange 120 at the inner end of the mounting piece 102 for the drill spider E. A pulling ring 121 is screwed to the front face of the cam control hub 112 and extends behind the circumferential flange 120 so that, while the control cam hub 112 is free to rotate with respect to the flange 120, linear movement of the control cam hub will likewise slide the spider E in its guideway 101. The interior of the inner end of the mounting tube 102 for the drill spider E is cut away as seen at 122 to provide clearance so that the mounting tube 102 may slide rearwardly over the front end of the control tube 99.

At the top of the annular wall 39 of the center bore 38 in the main support B is a threaded hole which registers with a hole 123 in the housing 40 of the top forming head C, and in said hole in the main frame B is a screw 124 which carries at its lower end a roller pin 125 which engages the cam groove 115 on the control hub 112. Thus, as the control hub 112 rotates with the control tube 99 the engagement of the roller pin 125 in the cam track 115 causes the hub 112 to reciprocate in the guideway 116, thereby producing the desired fore and aft movement of the drill carrying spider E. The front face of the main frame B adjacent the central bore 38 is drilled and tapped to receive screws 126 by means of which a cover plate 127 is secured to the main frame B so as to enclose the control hub 112.

Figure 22:
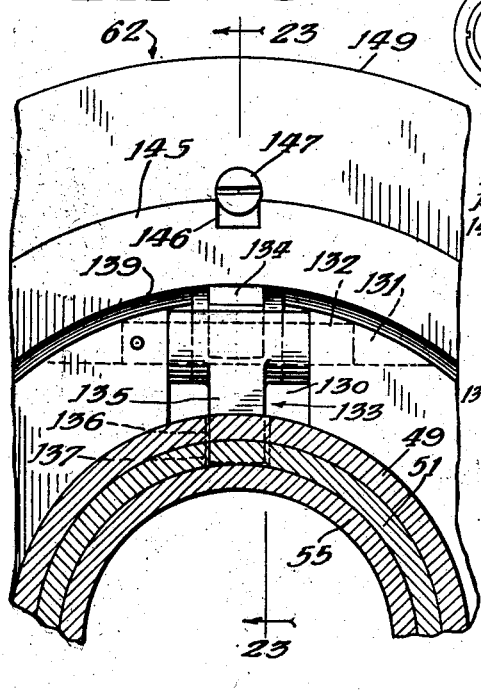
Fig. 22 is an enlarged fragmentary sectional view of the locking tube actuating mechanism for a single forming head, taken substantially along the line 21—21 of Fig. 2.
Figure 23:
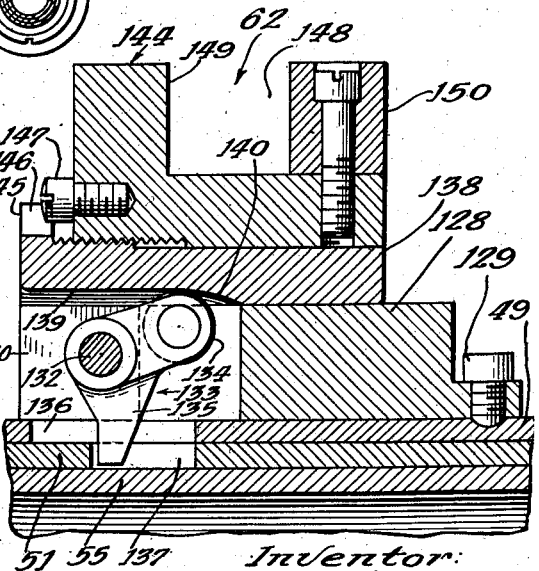
Fig. 23 is a fragmentary section taken as indicated along the line 23—23 of Fig. 2.

The next major component of the machine is the feed control cam drum assembly F which is mounted at the rear of the central distributing shaft assembly D behind the rear support bracket 97 and controls the operation of the locking tube actuator 62 and the pusher tube actuating ring 63. Referring first to Figs. 22 and 23, which show the detail of the pusher tube actuating assembly 62, the several tubes of the forming head C appear concentrically in Figs. 22 and 23 as the drive tube 49, the locking tube 51, and the pusher tube 55. A circumferential hub 128 is secured to the drive tube 49 by means of set screws 129, and the hub 128 has a recess 130 at its forward end and a transverse bore 131 to receive a pivot pin 132 which extends through the recess 130. Pivoted on the pivot pin 132 is a bell crank 133 which has at its rear end a roller 134 which projects above the level of the hub 128, and at its lower end a locking tube actuating finger 135 which extends through a slot 136 in the drive tube and into the front of a slot 137 in the locking tube. Loosely mounted on the hub 128 is a hardened cam ring 138 the forward portion of which projects beyond the front of the hub 128 and has an inner surface 139 which rides on the roller 134 of the lever assembly 133. The rear portion 140 of the inner surface 139 of the cam ring 138 is formed with a gradually reduced diameter so that forward movement of the cam ring 138 will pivot the lever assembly 133 about the pin 132, forcing the actuating finger 135 against the front of the slot 137 in the locking tube 51, thereby driving the locking collet 52 (Fig. 7) firmly into the locking ring 50 on the front of the forming head C. When the cam ring 138 slides rearwardly and takes the locking pressure off the lever assembly 133, the steep angle of the faces 53 and 54 at the front of the forming head C causes the locking collet 52 to be released sufficiently to permit the bar stock S to be moved forward by the pusher tube 55 and pusher collet 56.

Mounted on the cam ring 138 is an annulus 144 which is threaded at its forward end to screw onto a thread on the cam ring 138. As seen in Fig. 22 the forward end of the cam ring 138 is provided with an annular flange 145 which has four notches 146 spaced evenly about its periphery so that the fore and aft position of the annulus 144 with respect to the cam ring 138 may be adjusted by bringing a threaded aperture in the face of the annulus opposite one or another of the notches 146 and inserting a headed screw 147 which engages the notch 146 to fix the position of the annulus 144. Preferably the annulus has sixteen threads to the inch so that one-quarter turn of the annulus will produce 1/64 inch adjustment. The annulus 144 is provided with a deep circumferential channel 148, and for convenience of manufacture the annulus is made in two parts, there being a body portion 149 to which is screwed a separate rectangular ring 150 which defines the rear margin of the channel 148.

Referring to Fig. 13, at the extreme rear of the pusher tube 55 is a pusher tube actuating ring 63 which is formed in two parts 141 and 142 which are firmly secured together and to the pusher tube 55 by means of screws 143. The split construction of the pusher tube actuating ring 63 is so that the ring may be quickly removed in order to permit removal of the locking tube actuating assembly 62, which in turn permits the forming head C to be drawn forwardly out of the cell 36 in the main frame B.

Control of the actuating assembly 62 and the actuating ring 63 is by means of the feed control cam drum assembly F which is shown in detail in Fig. 16 and the various components of which are shown in Figs. 15 and 17–20. This assembly is mounted on the extreme rear of the control tube 99 of the central distributing shaft assembly D, to the rear of the rear distributing shaft support 97.

Mounted loosely on the control tube 99 of the central distributing shaft assembly D immediately outside the rear support bracket 97 is a drive gear 151 for the control tube 99. A locking control cam drum 152 and a pusher control cam drum 153 are mounted rearwardly of the gear 151, the drum 153 being keyed onto the control tube 99 and retained thereon by means of a retaining ring 154 which is secured to the rear of the fixed mounting shaft 98, and the locking control drum 152 having its hub 155 slidably mounted with a fairly tight friction fit in a pair of guideways on the hub 156 of the drum 153. There is a clearance between the outer end of the hub 155 and the inner end of the hub 156 so that the drum 152 may slide a short distance independently of the drum 153. The drum 152 is apertured at its forward end to receive a pair of threaded pins 157 by means of which it is screwed to the gear 151, and in order to permit the rearward sliding movement of the drum there is a clearance between the drum wall and the heads of the pins 157. Inasmuch as the drums 152 and 153 are keyed together and to the control tube 99, and the drum 152 is secured to the gear 151, if power is applied to the gear 151 it rotates the two drums, the control tube 99 and the drill spider control hub 112 at the front of the control tube 99.

As shown in Fig. 15, the locking control drum 152 is provided with a circumferential cam piece 158 which is provided with a pair of cam tracks 159 and 160 which are identical and are 180° out of phase. Loosely mounted surrounding the cam piece 158 is a locking control ring 161 (see Figs. 17 and 18) which has a pair of opposed bosses 162 to slidably receive roller pins 163 each of which engages one of the cam tracks 159 or 160. Two cam tracks and two pins are employed so as to prevent the ring 161 from rocking and binding on the drum 152. The locking control ring 161 is provided with eight radially projecting studs 164 each of which engages the annulus 144 for the locking tube actuating assembly 62 on one of the forming heads C (see Fig. 23). In order to prevent rotation of the locking control ring 161 it is provided with an aperture 165 to receive a pin 166 which extends into a complementary aperture 167 in the rear mounting bracket 97 (Figs. 3 and 4).

As seen in Fig. 15, the pusher control cam drum 153 is provided with a cam piece 168 which has spaced cam tracks 169 and 170 which are identical and which are 180° out of phase. Loosely mounted surrounding the cam piece 168 of the pusher control drum 153 is a broad control ring 171 (see Figs. 19 and 20) which is provided with a pair of opposed internal studs 172 one of which engages each of the cam tracks 169 and 170. A pair of spaced circumferential ribs 173 on the control ring 171 engage the pusher ring 63 on the rear of the pusher tube 55 of each of the forming heads C. Referring to Fig. 2, it will be seen that the pusher tube 55 for the uppermost forming head C has journalled upon it, to the rear of the pusher ring 63, a retaining member 174 which has a depending protuberance 175 to receive a pin 176 which extends into an aperture 177 in the rear flange 173 of the ring 171 so as to lock said ring against rotation (for detail see Fig. 14).

As previously mentioned in connection with the detailed description of the central distributing shaft assembly D, that assembly includes a drive tube 100 which is journalled on the control tube 99. Mounted on the drive tube 100 is the tool control drive G (see Fig. 6) by means of which power is transmitted from the central distributing shaft assembly D to the tool control drum 68 in each of the forming heads C. Referring now to Figs. 4, 5 and 6, the tool control drive G includes a cruciform frame 178 which is journalled on the front of the drive tube 100 immediately to the rear of the guideways 116 for the tool spider control hub 112. The cruciform frame 178 has three identical arms 179 and a modified bottom arm 179a, each of which extends outwardly along a line equidistant from the axes of a pair of adjacent forming heads C. Keyed on the drive tube 100 in spaced relation to the cruciform frame 178 is a drive gear 180 which meshes with four tool control gear trains, indicated generally at 181 (Fig. 5), there being a gear train 181 supported on each of the arms 179 of the cruciform frame. The gear trains 181 comprise a first gear 182 which is mounted on a pivot 183 on an arm 179 of the cruciform frame and which meshes with the drive gear 180. Integrally formed with the gear 182 is a smaller gear 184 which in turn meshes with a gear 185 which is mounted on a pin 186 adjacent the end of the arm 179. The gear 185, in turn, meshes with the drive gears 91 on the tool control drums 68 of the two forming heads C which flank the end of the arm 179. Thus, rotation of the drive tube 100 acts through the drive gear 180 and the four gear trains 181 to drive the eight tool control drums 68 of the forming heads C.

The main drive H for driving the eight forming heads C is best seen in Fig. 4, and consists of a hub 187 which is journalled on roller bearings 188 on the drive tube 100. The hub 187 is provided with a drive sprocket 189 by means of which it is driven from the motor J, and a main drive gear 190 which is positioned immediately to the rear of the drive gear 180 for the four gear trains 181. The large drive gear 190 is of such circumference that it meshes with all eight of the drive gears 57 on the drive tubes 49 of the eight forming heads C so as to rotate said drive tubes and the bar stock S carried therein.

Power for turning the control tube 99 of the central distributing shaft assembly D is provided by the intermediate gear train I (Fig. 4) which takes its power from the lowermost of the tool control gear trains 181 and transmits it to the control tube drive gear 151 which is mounted behind the rear support bracket 97. The modified lowermost arm 179a of the cruciform frame 178 has an extension 191 to rotatably receive the front end of an intermediate shaft 192 which is journalled adjacent its rear end in the rear support bracket 97. A spur gear 193 is keyed on the intermediate shaft 192 immediately adjacent the extension 191 on the cruciform frame, and meshes with the outermost gear 185 in the adjacent tool control drum gear train 181. At the opposite end of the intermediate shaft 192, outside the rear support bracket 97, there is keyed a spur gear 194. As best seen in Fig. 3, a gear 195 which is mounted on a pin 196 in the rear support bracket 97 meshes with the spur gear 194 and also with a gear 197 mounted on a pin 198 in the rear support bracket 97, the gear 197 in turn meshing with the control tube drive gear 151. Thus, rotation of the drive tube 100 drives not only the four tool control gear trains 181, but also the intermediate drive I and thus the control tube 99 with its feed control cam drum assembly F and the spider control hub assembly E'.

Mounted on the intermediate shaft 192 just inside the rear support bracket 97 is a sprocket 199 to receive a drive chain 200 (Fig. 4) which operates a pump to supply coolant oil from the oil reservoir in the base casting 30 to the cutting tools and drills, in the conventional manner.

The drive for the entire machine is by means of the motor J which is mounted on the motor block 32, and the gear reduction unit J' which is mounted on the base 33, both of which are on the platform base 31 of the base assembly A. The driving connections between the motor J, gear reduction unit J' and the central distributing shaft assembly D are best seen in Figs. 2 and 3. The motor J is a 10 H. P. slip ring motor having a shaft 201 on which are a direct drive sprocket 202 and a speed reduction drive sprocket 203. The direct drive sprocket 201 drives a roller chain 204 which meshes with the sprocket 189 of the main drive H, so as to furnish power directly through said sprockets and chain and the main drive gear 190 to the drive gears 57 for the eight forming heads C. On the speed reduction drive sprocket 203 is a roller chain 205 which also meshes with a sprocket 206 on an input shaft of the speed reduction unit J'. The speed reduction unit reduces the speed in a ratio of 20–1, and is provided with an output shaft on which is journalled a sprocket 207, and a positive dog clutch 207a is keyed on the shaft so that the drive through the sprocket may be disconnected when desired. The sprocket 207 meshes with a roller chain 208 which also meshes with a drive sprocket 209 which is keyed on the drive tube 100 of the central distributing shaft assembly D immediately in front of the rear support bracket 97. Thus, the entire control mechanism for the feed of the bar stock, the forming tools, and the drill carrying spider is operated through the speed reduction unit J' by means of the roller chain 208.

The use of a slip ring motor permits the motor shaft sprocket 201 to be turned at any speed within the speed range of the motor.

The operation of the unit is believed obvious from the foregoing description. Assuming that there is a piece of bar stock S in each of the forming heads C, and that the bar stock is in the appropriate position to be worked by the cutting tools and drill, with the locking collets 52 of the forming heads C pushed forward to lock the bar stock in working position, the machine may be started by throwing a motor switch (not shown) to start the motor J. The motor operates at a desired speed through the direct drive roller chain 204, the main drive assembly H and the gears 57 on the drive tubes 49 of the forming heads C to turn the bar stock at a relatively high rate of speed. The control drive from the gear reduction unit J' through the roller chain 208 to the sprocket 209 on the drive tube 100 drives the tool drum control gear trains 181 through the gear 180 on the drive tube so as to rotate the tool cam drums 68 in the eight forming heads, thus causing the forming tool 65 and the cutoff tool 82 (see Fig. 8) to move sequentially into cutting engagement with the forward portion of the bar stock so as to first form the face of, and then cut off a nut blank N of the sort shown in Fig. 10a. The lowermost gear train 181, operating through the intermediate drive I to the control tube drive gear 151, rotates the control tube 99. The unit is so timed that while the forming tools 65 on the forming heads C are forming the faces of the nut blanks the drill spider control drum 112 slides rearwardly in its keyway on the control tube 99, drawing the drill spider E with it so as to bring the drill bits 109 into engagement with the ends of the rotating pieces of bar stock S in the forming heads, thus drilling the nut blanks. When the drilling is complete the drill bits 109 are quickly withdrawn from the bar stock by reason of the sharply angled portion 115a of the cam track 115 on the spider control drum 112.

Rotation of the control tube drive gear 151 also drives the bar feed control cam drum assembly F at the rear of the control tube 99. While the forming and cutoff operations are in progress in the eight forming heads, the pins 163 of the locking control ring 161 ride in the straight portions of the cam tracks 159 and 160 of the locking control drum 152. Immediately upon completion of the cutoff operation by the cutoff tool 82, said pins 163 enter the offset portions 159a and 160a respectively of the cam tracks 159 and 160 to retract the cam rings 138 on the locking tube actuating assemblies 62 of the eight forming heads, thus freeing the bar stock for forward movement which is supplied by the pusher tube 55 and pusher collet 56. The studs 172 on the pusher control ring 171 enter the offset portions 169a and 170a of the cam tracks 169 and 170 on the pusher control cam drum 153 substantially simultaneously with the releasing of the locking collet 52, and the stop control pin 88 of the rocking shaft 84 in each of the forming heads C enters the offset portion 89a of the face cam track 89 which controls the position of the rocking shaft 84, so as to pivot the stop arms 85 into their stop positions in front of the bar stock S. Thus, when the pusher tubes 55 and pusher collets 56 advance the bar stock it is stopped at the desired location by the stop arms 85. The pins 163 on the locking control ring 161 then move out of the offset portions 159a and 160a of the cam tracks 159 and 160 to again slide the cam ring 138 on the locking tube actuating assembly 62 forwardly so as to drive the locking tube 51 forward and again clamp the locking collet 52 onto the bar stock. Immediately, the pins 172 on the pusher control ring 171 move out of the offset portions of the cam tracks 169 and 170 to retract the pusher tube 55. The stop arms 85 are then rocked to their idle positions away from the front of the bar stock S, and the forming operation proceeds on a new set of nut blanks N.

When it is necessary to put new bar stock into a forming head C, the machine is stopped and a lever is engaged with the lock control cam drum 152 to slide the drum and control ring 161 rearwardly, the drum moving away from the control tube drive gear 151 and towards the pusher control drum 153. This retracts all the locking cam rings 138 of the locking tube actuating assembly 162 permitting new bar stock to be inserted into any forming head which requires it. The lever may then be used to return the drum 152 and ring 161 to their normal positions, and the machine may be again started to commence a new operation. If desired the lever may be pivoted permanently on the frame.

Bolted on the main frame B directly outside one of the forming heads C is a small gear box 210 in which is mounted gear means having a shaft provided with a square shank 212 to receive a removable crank. The main frame B and the housing 40 for the adjacent forming head are slotted immediately over the gear 91 on the tool control cam drum 68, and a gear 213 which is journalled in a yoke on the gear box 210 extends through the aforesaid slot and meshes with the gear 91 as well as with the gear means in said box. This assembly permits the tool control to be operated by hand when the clutch 207a for the sprocket 207 on the speed reduction unit is disengaged, to permit small, precise movements of the control assembly in case of gear breakage or other accident which might necessitate that the control system be set at a particular place.

From the drawings and description of the machine, it is clear that the forming head unit C provides a basic structure which may be employed with a single distributing shaft assembly D and appropriate drive and control connections to build up machines having either one, two, four, six, eight or more forming heads. The main frame B for units having less than eight heads must be re-arranged slightly, so that in a two head machine the pair of forming heads are at equal angular distances from the vertical axis of the machine, in order to provide a balanced unit using a single tool control gear train 181. Likewise, the four head machine and the six head machine require a somewhat different frame arrangement from that here shown; but the basic operating and control elements for all the units may remain the same.

In the case of a two or four head machine the weight of the unit may be considerably reduced by providing a pair of fixed supporting shafts which extend rearwardly from the main frame B to slidably support a pair of arcuate control members which engage the locking control cam drum and the pusher control cam drum, instead of employing the ring support on the drums themselves as described with respect to the eight head machine.

The ease with which the forming tools may be removed from the forming heads C permits the machine to be readily modified to perform different operations; and the drill carrying spider E may be utilized to support tools other than drills.

It is possible to construct a forming head C which has three or four cutting tools mounted on its front face, the cutting tools in such a forming head being disposed at angles of 47½° from one another so that they may clear each other as they reciprocate, and there being an additional tool control groove in the tool control cam drum and an additional set of tool actuating elements similar to those described herein.

A great advantage of the present construction is the ease with which the entire unit may be assembled, and conversely, the simplicity of removing various elements for repair or replacement. The complete machine includes a number of sub-assemblies each of which may be separately assembled so that the final assembly operation is relatively simple and brief. The castings 30 and 31 for the base assembly are bolted together at the place of use, and the main frame B and motor and gear reduction unit J and J' bolted to the platform base. The front distributing shaft base member 95 is next mounted on the base assembly. All of the forming heads C except the top one may be inserted in the main frame B at this time. In order to permit timing of the forming heads their control gears should be positioned so that the stop arms 85 are all at their dead center positions directly in front of the axes of the bar stock turning and feed assemblies 48. This is a readily located point at which all the heads may be set.

The central distributing shaft assembly D includes or supports as major components the fixed mounting shaft 98 carrying the mounting piece 102, the tool spider E and the spider control cam hub 112; the control tube 99 journalled on the fixed mounting shaft 98; the drive tube 100 on which is journalled the cruciform frame 178 which carries the four gear trains 181, the main drive H which is journalled on the drive tube 100, the drive sprocket 209 on the drive tube 100, the rear support bracket 97 and the feed control cam drum assembly F.

The fixed mounting shaft 98 carrying the mounting piece 102, the tool carrying spider E and the spider control hub 112 are moved into position from the front of the main frame B, and the mounting shaft 98 is extended through the central opening 37 in the main frame. The removable shaft front bracket 96 at the front of the mounting shaft 98 is bolted to the front base member 95, and the rear of the mounting shaft 98 is temporarily supported on jacks. The spider may have all the drill holders on it if desired except the one for the top forming head.

The control tube 99 is next slid onto the mounting shaft 98 from the rear, and the guideways 116 are engaged with the guide blocks 117 on the spider control hub 112. The screw 124 may then be inserted in the threaded hole at the top of the annular wall 39 of the central bore in the main support B, so that the roller pin 125 engages the cam groove 115 of the spider control hub 112. Thereafter the top forming head C may be placed in its cell in the main frame B.

The drive tube 100 supporting the cruciform frame 178 which carries the four gear trains 181 is next slid onto the control tube 99 from the rear and the outermost gears 185 on the gear trains 181 are meshed with the drive gears 91 on the eight tool control drums 68 in the forming heads C. The hub 187 for the main drive H, with its roller bearings 188 is next placed on the drive tube 100 from the rear, and the main drive gear 190 is meshed with the drive gears 57 for the eight forming heads C. The drive chain 204 for the main drive H is then mounted; after which the drive sprocket 209 is mounted on the drive tube 100 and the roller chain 208 is put in place.

The intermediate shaft 192 for the intermediate gear train I is then journalled in the extension 191 of the lowermost arm 79a of the cruciform frame, and the rear support bracket 97 is bolted to the base assembly A and engaged with the rear ends of the control tube 99 and the intermediate shaft 192 which are journalled therein. The rear support bracket 97 carries the gears 195 and 197, and the spur gear 194 is mounted upon the rear of the intermediate shaft 192 in mesh with the gear 195.

The next step in the assembly operation is to slide onto the rear of the control tube 99 the feed control cam drum assembly F with the associated control tube drive gear 151 which is meshed with the gear 197 on the rear support bracket 97. The retaining member 154 for the feed control cam drum assembly F is then secured to the rear of the fixed shaft 98.

During this part of the assembly operation the pusher tube actuating rings 63 are not mounted on the pusher tubes of the eight forming heads C, and the locking tube actuating assemblies 62 are not wholly assembled. In order to insert a forming head C in the main frame B the circumferential hub 128 must be off the actuating assembly 62, and after the forming heads are in place in the main frame the hubs 128 are slid onto the actuating assemblies 62 from the rear and the lever assemblies 133 and their pivot pins 132 are inserted in said hubs. The locking control ring 161 on the feed control cam drum assembly F is in a position such that the studs 164 thereon are adjacent the annuli 144 of the locking tube actuating assemblies, and it may be rotated to engage said studs with said annuli. It is then necessary to insert the retaining pin 166 in the locking control ring 161 and screw it into the rear support bracket 97.

The last assembly steps are to place the pusher actuating rings 63 on the pusher tubes for the eight forming heads in engagement with the cam groove formed by the parallel cam ribs 173 on the pusher tube actuating ring 171, and to mount the retaining member 174 on the rear of the uppermost forming head C to receive the pin 176 which locks the pusher actuating ring 171 against rotation.

From the foregoing description of the assembly it is clear that the structure is exceedingly simple to assemble, considering its complex nature; and the simplicity of assembly assures that various component parts may be readily removed for repair or replacement, in most cases without disturbing associated parts. In particular, it is highly advantageous to be able to simply remove the forming heads C so that different forming heads, adapted to perform different operations may be inserted in the cells 36 of the main frame B, and to readily change the forming tools.

The foregoing detailed description is given for clearness of understanding only and no unnecessary limitations are to be understood therefrom, as some modifications will be obvious to those skilled in the art.

I claim:

1. A multiple head, automatic bar cutting machine, comprising: a main frame having a central bore and a plurality of peripheral bores with their axes in equidistant, parallel relationship to said central bore; a removable housing for a forming head unit in each of said peripheral bores; a tubular shaft journalled in each housing to axially receive a piece of bar stock and having a drive gear keyed thereon; reciprocable locking and pushing means in each tubular shaft for feeding bar stock intermittently forward, said means extending rearwardly of the housing; actuating members on the rear of said locking and pushing means which are adapted to be engaged by control means; a forming tool mounted on the front of each housing for radial movement into and out of engagement with bar stock in the forming head; means in each housing to cause radial movement of said forming tool, said means including a tool control drum journalled on said tubular shaft which has a cam track to control movement of the tool and a drum drive gear through which it may be driven; a fixed distributing shaft axially supported in said central bore; a central control tube journalled on said distributing shaft, said control tube having a control tube drive gear; a control cam drum assembly at the rear end of the control tube, said drum assembly including a control cam drum with cam track means, said drum being keyed on the control tube, and longitudinally slidable means engaging the cam track means on the drum and the actuating members on the rear of the locking and pushing means in each forming head; a drive tube journalled on said control tube, said drive tube having a power gear by which it may be driven and a control drive gear; a tool control gear train connecting said control drive gear to the tool control drum drive gear on two adjacent forming heads, there being a separate gear train for each pair of forming heads; an intermediate gear train meshing with a control gear train and with the control tube drive gear; a main drive gear journalled on the drive tube which meshes directly with the drive gears on the tubular shafts in all the forming heads; and a motor having a direct driving connection with said main drive gear and an indirect driving connection with the power gear on the drive tube.

2. The device of claim 1 in which a stop member is journalled in the front of each housing and has an arm which may be rocked to a position in front of the bar stock to limit movement of the bar stock by the feeding means, the tool control drum is provided with a face cam to control the movement of the stop member, a control hub having a circumferential cam track is mounted at the front of the control tube, and a spider having a fixed drill bit in front of the bar stock in each forming head is slidably mounted on the front of the distributing shaft and engages the control hub so that rotation of the control tube moves the forming tools into and out of engagement with the end of the bar stock, the movement of said stop member and said spider being timed so that the tools and the stop member engage the bar stock intermittently.

3. In an automatic bar cutting machine: a base; a front distributing shaft support at the front of said base provided with a removable distributing shaft front bracket; a rear distributing shaft bracket at the rear of said base; a fixed distributing shaft mounted on said bracket, said shaft having a guideway at its front end; a main frame surrounding said shaft between, and spaced from both said supports; a removable pin on said frame adjacent said shaft; a tool carrying member slidably mounted on said guideway; a control tube journalled on said shaft behind the guideway; a control hub slidably mounted in a guideway on said control tube, said hub having a circumferential cam track engaging said removable pin and being engaged with said tool carrying member so that rotation of the control tube slides said hub and tool carrying member back and forth, removal of the front shaft bracket and said removable pin permitting removal of the tool carrying member and control hub from said distributing shaft.

4. An automatic bar cutting machine, comprising: a frame having a cell extending therethrough; a forming head housing removably mounted in said cell, said housing having a side wall, and a front wall provided with an opening; chucking means rotatably mounted in said housing with its axis in line with said opening; cutter means movably mounted on said front wall; cutter control cam means in said housing for controlling the movement of said cutter means; and a shaft assembly in said frame parallel to the axis of the chucking means, said assembly including means for rotating said chucking means and said control cam means.

5. The machine of claim 4 in which the chucking means and the control cam means are provided with parallel drive gears which are normal to the axis of the chucking means, and the means in the shaft assembly for rotating the chucking means and the control cam means includes a gear means in the plane of each of said drive gears and meshing therewith.

6. The machine of claim 4 in which the control cam means includes a cam drum journalled on the chucking means and provided with an integral coaxial drive gear, the chucking means is provided with an integral coaxial drive gear, and the means in the shaft assembly for rotating said chucking means and said control cam means includes separate gear means meshing with each of said drive gears.

7. The machine of claim 4 in which a reciprocable work piece feeding assembly is coaxial with the chucking means and extends rearwardly from the forming head housing, and the shaft assembly includes a feed control member directly engaged with said feeding assembly and cam means to reciprocate said control member and move a work piece intermittently forward in said chucking means.

8. The machine of claim 4 in which a reciprocable work piece feeding assembly is coaxial with the chucking means and extends rearwardly from the forming head housing, and the shaft assembly includes a fixed mounting shaft, a control tube journalled on said shaft, a feed control cam drum secured to the rear of said control tube so as to be rotatable therewith, cam follower means engaged with said cam drum and with said feeding assembly to reciprocate said assembly and move a work piece intermittently forward in said chucking means, a tool carrying arm slidably mounted on said mounting shaft with a fixed forming tool in front of the opening in the housing, and a cam hub slidably keyed on the front of the control tube and engaged with said arm to reciprocate said forming tool, said cam drum and said cam hub being synchronized to move the tool toward the housing when the feeding assembly is at rest.

9. The machine of claim 8 in which a work piece stop member is pivotally mounted on the front wall of the housing for movement between an idle position and a stop position aligned with the opening in said front wall, the cutter control cam means in the housing includes a cam member operatively connected with the stop member to pivot said member, and said cam member is so synchronized with the control tube on the shaft assembly that the stop member moves to stop position as the feeding assembly moves a work piece forward.

10. A forming head unit for an automatic bar cutting machine, comprising: a housing having a side wall, and a front wall provided with an opening; chucking means rotatably mounted in said housing with its axis in line with said opening; cutter means movably mounted on said front wall; cutter control cam means in said housing for controlling the movement of said cutter means; a chuck drive gear coaxial with the chucking means for driving said chucking means; and a cam drive gear rotatably supported on the housing in a plane parallel to the chuck drive gear for driving the cutter control cam means, said chuck drive gear and said cam drive gear having peripheral teeth which are directly engageable from outside the housing, whereby said forming head may be removably mounted in an automatic bar cutting machine as a prefabricated sub-assembly with said peripheral teeth in driving engagement with drive gear means in said machine.

11. A forming head unit for an automatic bar cutting machine comprising: a housing having a side wall, and a front wall provided with an opening; chucking means rotatably mounted in said housing with its axis in line with said opening; cutter means movably mounted on said front wall; cutter control means in said housing for controlling the movement of said cutter means, said control means including a cam drum journalled on said rotatable chucking means; a coaxial chuck drive gear secured to the chucking means; and a coaxial cam drive gear secured to said cam drum, said chuck drive gear and said cam drive gear having peripheral teeth which are directly engageable from outside the housing, whereby said forming head may be removably mounted in an automatic bar cutting machine as a prefabricated sub-assembly with said peripheral teeth in driving engagement with drive gear means in said machine.

12. The forming head unit of claim 11 which includes reciprocable work piece feeding means engageable with a work piece in the chucking means to intermittently feed the work piece forward, a pivoted work piece stop member on the front wall of the housing, and means for rocking said stop member between an idle position and a stop position aligned with the opening in said front wall, said means including a cam track in the control cam drum and a control pin engaged with said track and operatively connected to the stop member.

13. The forming head unit of claim 11 which includes reciprocable work piece feeding means engageable with a work piece in the chucking means to intermittently feed the work piece forward, a rocking shaft journalled in the front wall of the housing which has a rocker member provided with a pin, a face cam on the control cam drum with which said pin is engaged, and a work piece stop member mounted on the rocking shaft for movement between an idle position and a stop position aligned with the opening in the front wall.

14. The forming head unit of claim 11 in which the cutter control means includes a rack mounted for sliding movement parallel to the chucking means and having a pin engaging a circumferential cam track in the control cam drum, the cutter means includes a slidable mounting block, and a rocker arm is pivotally connected to said mounting block and has teeth engaging said rack.

References Cited in the file of this patent

UNITED STATES PATENTS

| | | |
|---|---|---|
| 1,498,513 | Groene | June 17, 1924 |
| 1,539,440 | Smith | May 26, 1925 |
| 1,853,074 | Mulka | Apr. 12, 1932 |
| 1,955,220 | Biewend et al. | Apr. 17, 1934 |
| 2,115,938 | Baxendale | May 3, 1938 |
| 2,255,170 | Kelley | Sept. 9, 1941 |
| 2,299,630 | Kelley | Oct. 20, 1942 |
| 2,321,393 | Kelley | June 8, 1943 |
| 2,351,220 | Martin | June 13, 1944 |
| 2,410,026 | Groene | Oct. 29, 1946 |
| 2,534,993 | Robichaud | Dec. 19, 1950 |
| 2,624,102 | Green | Jan. 6, 1953 |